June 16, 1936.  H. WÄLTI  2,044,552
INTERNAL COMBUSTION ENGINE
Filed Nov. 9, 1934  2 Sheets-Sheet 2
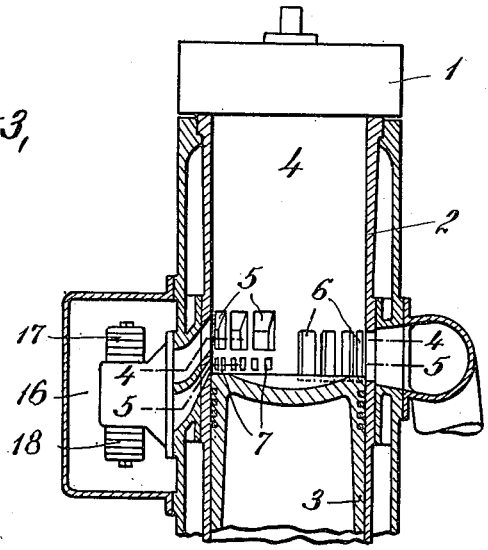
Fig. 3,
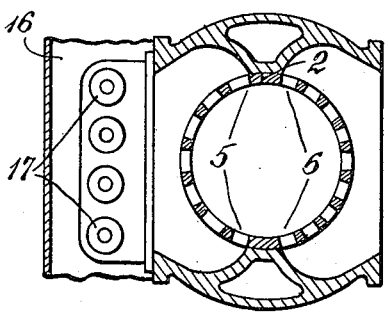
Fig. 4,
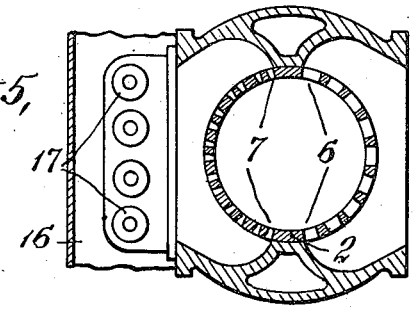
Fig. 5,
INVENTOR
Heinrich Wälti
BY
Pennie, Davis, Marvin & Edmonds
HIS ATTORNEYS Patented June 16, 1936

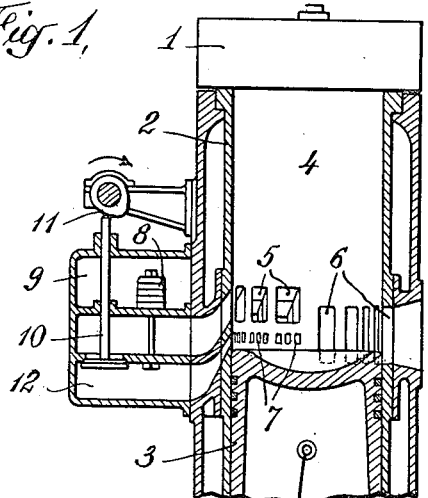
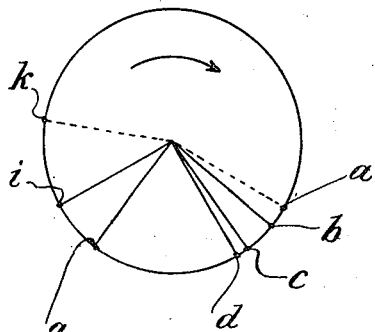
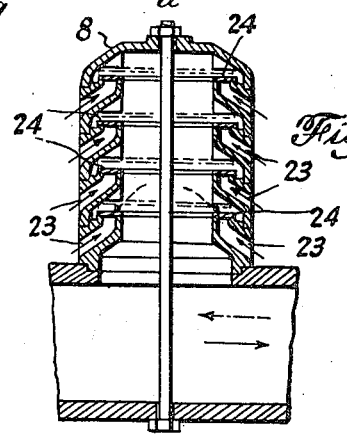
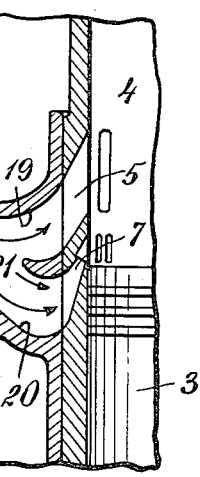
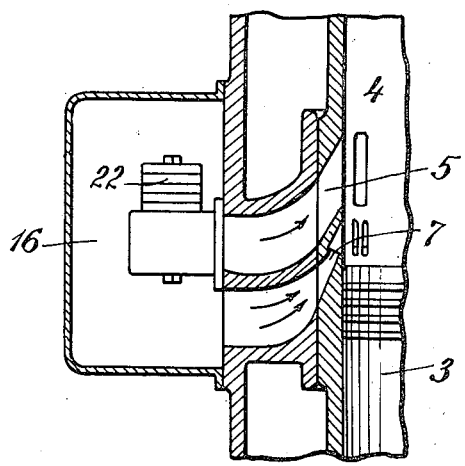

2,044,552

UNITED STATES PATENT OFFICE 2,044,552

INTERNAL COMBUSTION ENGINE

Heinrich Wälti, Winterthur-Wulflingen, Switzerland, assignor to Sulzer Frères Société Anonyme, Winterthur, Switzerland Application November 9, 1934, Serial No. 752,213
In Switzerland November 11, 1933

6 Claims. (Cl. 123—65)

This invention relates to internal combustion engines of the two-stroke cycle type, and more particularly to two-stroke internal combustion engines of the kind in which scavenging air is admitted and exhaust gases escape respectively through ports situated in the cylinder wall so as to be controlled by the piston, and an auxiliary port or set of ports is provided through which is introduced a supplementary air current which tends to deflect the scavenging air towards the cylinder head.

It has hitherto been proposed to provide auxiliary ports in the same transverse plane between the exhaust and scavenging ports, through which auxiliary ports supplementary air is delivered at a pressure higher than that of the scavenging air so that the supplementary air tends to deflect the incoming scavenging air towards the cylinder head. Prior arrangements, however, have not taken into account the fact that efficient scavenging can only be obtained within definite speed limits of the scavenging air, since when the air velocity is above a given value, the air instead of sweeping away the waste gases from within the cylinder, tends to mix therewith, thus impairing effective utilization of the scavenging air. Heretofore, also, the supplementary air entered the cylinder as soon as the pressure therein fell to a value equal to that of the supplementary air, i. e. before the pressure within the cylinder had fallen to the atmospheric pressure, and hence the consumption of air was heavy.

The principal object of the present invention is to provide an internal combustion engine construction of improved operating efficiency through producing a more complete scavenging or removal of the burned gases from the cylinder and through causing the cylinder to be charged with air which is contaminated to the least possible extent with burned, or partially burned, gases from the previous expansion stroke.

A further object of the invention is to provide an engine construction which will produce efficient scavenging even though the scavenging air in whole or in part is charged into the cylinder at high velocity.

Another object of the invention is to reduce the consumption of compressed air by the engine.

The invention will be understood from a consideration of the accompanying drawings, illustrating by way of example several embodiments of the invention, together with the following detailed description.

In these drawings—

Fig. 1 illustrates in longitudinal section a two-stroke cycle internal combustion engine cylinder having piston-controlled ports arranged according to the invention.

Fig. 2 is a crank diagram of the engine.

Fig. 2a is a transverse vertical section drawn to an enlarged scale of a non-return air valve included in Fig. 1.

Fig. 3 is a view similar to that of Fig. 1 but of a modified construction.

Figs. 4 and 5 are sections on the lines 4—4, 5—5, respectively, of Fig. 3.

Fig. 6 shows on an enlarged scale a modified arrangement of the air admission passages, and Fig. 7 is a view similar to that of Fig. 6 showing another modification of the air admission conduits.

In the construction illustrated in Fig. 1, the cylinder head 1, liner 2 and piston 3 together constitute the walls of the combustion chamber or cylinder 4 to which scavenging air is admitted through main air admission ports 5 and waste gases discharged through exhaust ports 6. Auxiliary air admission ports 7 are provided which are of such dimensions and are so supplied with air that the air flowing through them into the working chamber 4 will flow at a velocity appreciably higher than that of the air flowing into the cylinder through the main air admission ports 5.

As will be commented upon later, the auxiliary air admission ports 7 are so positioned in the wall of cylinder 4 that they will be uncovered by piston 3 after the uncovering of main air admission ports 5 and exhaust ports 6. These auxiliary air admission ports 7 are preferably, though not necessarily, arranged within the arc of the cylinder wall containing the main air admission ports 5. Each of the auxiliary ports 7 is appreciably less in cross-section than each of the main air admission ports 5, the total cross-section of the auxiliary ports 7 being, for example one-sixth of the total cross-section of the main air admission ports 5. For each main air admission port 5 in the example shown in Fig. 1, three auxiliary air admission ports 7 are provided.

Air is supplied to the main air admission ports 5 through an automatically, i. e. a pressure, controlled valve 8 from a chamber or conduit 9 to which scavenging air is supplied at a relatively low presure. Valve 8 is a non-return valve for permitting the passage of air from conduit 9 to the ports 5, but preventing flow in the opposite direction. It is provided because the charging ports 5 are uncovered by the piston 3 before the exhaust port 6 and it prevents the products of combustion from entering the scavenging air conduit 9 between the time when the descending piston uncovers the charging ports and the time when the pressure in the cylinder has fallen to the same value as the scavenging air pressure. This valve is so constructed as to cause a drop in pressure of the smallest possible amount in the scavenging air passing through it. Thus the valve body is provided with openings 23 for the air passing through in the direction shown by the full arrows. In the valve body, as shown in Fig. 2a, are ring-shaped valve plates 24 which rest on circular valve seat 25. If there is an excess pressure in the cylinder, it forces valve plates 24 onto the seats 25 in the direction of the dotted arrows. If the pressure in the cylinder has fallen below the pressure of the air to be led through the passages 23, the valve plates are raised by this pressure into the dotted positions, thus giving the air free entry into the interior of the cylinder.

A valve 10 operated by cam 11 controls the communication between the ports 5 and a chamber 12 to which air is supplied at high pressure and from which air flows to the auxiliary ports 7. Thus, whilst charging air is freely supplied at high pressure from the chamber 12 to the auxiliary ports 7, the admission of high pressure air to the main air admission ports 5 is controlled by the valve 10.

During the expansion stroke the upper edge of the piston 3, which is connected by a rod 13 to the engine crank 14, uncovers the upper edges of the main air admission ports 5 when the piston reaches the point in its stroke corresponding to the crank position a (Fig. 2), the piston commencing to uncover the exhaust ports 6 at the point b. After the pressure in the cylinder has fallen to atmospheric pressure, say, at the point c, scavenging air at low pressure commences to enter the cylinder through the valve 8 and main air admission ports 5. At the point d the piston commences to uncover the auxiliary air admission ports 7 so that supplementary air flows through the ports 7 into the cylinder, these ports being upwardly directed so that the supplementary air, entering at high velocity, forms a screen which tends to prevent the scavenging air from flowing directly across the cylinder from the ports 5 to the exhaust ports 6, and to ensure that the scavenging air flows upwards towards the cylinder head 1.

As the piston commences to move on the compression stroke, it first commences to close the auxiliary air admission ports 7, whereupon the valve 10 commences to open and is fully open when the piston reaches the point g, i. e., when the auxiliary air admission ports 7 have been closed. The working chamber 4 is now charged with air at high pressure this charging continuing until the air admission ports 5 are closed, say, at the point i, whereupon the valve 10 commences to close and is finally closed approximately at the point k.

In the construction shown in Figs. 3, 4 and 5, both the main air admission ports 5 and the auxiliary air admission ports 7 are supplied with air from a common supply chamber or conduit 16, the air flowing from the chamber 16 to the ports 5 being automatically controlled by a valve 17 whilst the air flowing from the chamber 16 to the ports 7 is automatically controlled by a valve 18. Valves 17 and 18 are non-return valves similar in construction to valve 8 of Fig. 1. As will be seen from Fig. 5, the auxiliary air admission ports 7 are regularly spaced apart in the cylinder wall.

In the modified arrangement illustrated in Fig. 6, the walls 19, 20 bounding each passage leading from a common conduit 21 to the auxiliary air admission ports 7 are so formed that the supplementary air is kept back as it flows towards the auxiliary ports. The air thus flows from the ports 7 into the working chamber at a speed appreciably above that at which the air flows through the main air admission ports 5, since the cross-sectional area available for the flow of air through the ports 7 is only a fraction of that available for the flow of air through the main air admission ports 5.

In Fig. 7 the air flows freely from the supply chamber 16 to the auxiliary ports 7 whilst the flow of air from the chamber 16 to the main air admission ports 5 is controlled automatically by a non-return valve 22 similar to valve 8 in Fig. 1.

It will be understood that the constructions described above are given by way of example only and that details may be modified within the scope of the appended claims.

I claim:

1. In a two-stroke cycle internal combustion engine, the combination of a cylinder, the wall thereof having piston controlled exhaust and main air admission ports, said wall also having auxiliary air admission means arranged to be uncovered by the piston during the expansion stroke after the uncovering of the exhaust and main air admission ports, means for delivering air to the main air admission ports, and means for causing air to be discharged through the auxiliary air admission means at a velocity appreciably greater than that of the air entering through the main air admission ports and sufficient to form a screen which tends to prevent air entering the cylinder through the main air admission ports from flowing directly to the exhaust ports.

2. In a two-stroke cycle internal combustion engine, the combination of a cylinder, the wall thereof having piston controlled exhaust and main air admission ports, said wall also having auxiliary air admission means arranged to be uncovered by the piston during the expansion stroke after the uncovering of the exhaust and main air admission ports, means for delivering air at low pressure to the main air admission ports, and means for supplying air at relatively high pressure to the auxiliary air admission means, said air being so directed into the cylinder as to act as a screen tending to prevent the flow of air from the main air admission ports directly to the exhaust ports.

3. In a two-stroke cycle internal combustion engine, the combination of a cylinder, the wall thereof having a plurality of piston controlled exhaust and main air admission ports, the main air admission ports being disposed substantially opposite the exhaust ports, said wall also having a plurality of auxiliary air admission ports arranged substantially within the arc of the cylinder wall containing the main air admission ports, there being at least twice as many auxiliary air admission ports as there are main air admission ports, and means for causing air to flow into the cylinder through said auxiliary ports at a velocity sufficient to form a screen which tends to prevent the flow of air from the main air admission ports directly to the exhaust ports.

4. In a two-stroke cycle internal combustion engine, the combination of a cylinder, the wall thereof having piston controlled exhaust and main air admission ports, said wall also having auxiliary air admission means arranged to be uncovered by the piston during the expansion stroke after the uncovering of the exhaust and main air admission ports, and a common supply conduit for conveying air to said main air admission ports and said auxiliary air admission means, the pressure in said conduit being sufficient to cause the air to flow through said auxiliary means at a sufficient velocity to form a screen which tends to prevent the flow of air from the main air admission ports directly to the exhaust ports.

5. In a two-stroke cycle internal combustion engine, the combination of a cylinder, the wall thereof having piston controlled exhaust and main air admission ports, said wall also having auxiliary air admission means arranged to be uncovered by the piston during the expansion stroke after the uncovering of the exhaust and main air admission ports, means for supplying air at low pressure to said main air admission ports, means for supplying air to said auxiliary air admission means at a higher pressure, and means for supplying air to the cylinder through said main air admission ports from a source of higher pressure after the commencement of the compression stroke so as to supercharge the cylinder before compression takes place.

6. In a two-stroke cycle internal combustion engine, the combination of a cylinder, the wall thereof having piston controlled exhaust and main air admission ports, said wall also having auxiliary air admission means arranged to be uncovered by the piston during the expansion stroke after the uncovering of the exhaust and main air admission ports, means for supplying air at low pressure to said main air admission ports, means for supplying air at a higher pressure to said auxiliary air admission means so as to cause the air to flow through said ports at a sufficient velocity to form a screen which tends to prevent the air entering the cylinder through said main auxiliary ports from flowing directly to the exhaust ports, and a valve actuated to connect said main air admission ports with said high pressure air supply after the commencement of the compression stroke to supercharge the cylinder.

HEINRICH WÄLTI.